US007734430B2

(12) United States Patent
Smith

(10) Patent No.: US 7,734,430 B2
(45) Date of Patent: *Jun. 8, 2010

(54) DETERMINING POWER

(75) Inventor: David E Smith, Vancouver, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 811 days.

This patent is subject to a terminal disclaimer.

(21) Appl. No.: 11/340,929

(22) Filed: Jan. 27, 2006

(65) Prior Publication Data

US 2007/0189797 A1 Aug. 16, 2007

(51) Int. Cl.
*G01L 1/00* (2006.01)

(52) U.S. Cl. ......................... 702/44; 219/216; 320/128; 331/176; 347/12; 363/24; 363/125; 417/53; 700/22; 702/61

(58) Field of Classification Search .................. 702/44, 702/61, 64, 182–185, 187, 188; 324/76.11, 324/76.17; 323/282; 361/90, 93.7; 713/300, 713/320; 307/149; 700/22; 347/12, 14; 348/372; 363/24, 125; 320/128; 331/176; 417/53

See application file for complete search history.

(56) References Cited

U.S. PATENT DOCUMENTS

| | | | | |
|---|---|---|---|---|
| 3,727,103 | A | | 4/1973 | Finch et al. |
| 4,016,408 | A | | 4/1977 | Koetzle |
| 4,495,568 | A | | 1/1985 | Gilbert et al. |
| 4,539,487 | A | | 9/1985 | Ishii |
| 4,569,585 | A | | 2/1986 | Masuda |
| 4,809,608 | A | | 3/1989 | Wolnick et al. |
| 5,013,981 | A | | 5/1991 | Rodi |
| 5,086,570 | A | | 2/1992 | Matheus |
| 5,214,442 | A | | 5/1993 | Roller |
| 5,229,651 | A | | 7/1993 | Baxter, Jr. et al. |
| 5,248,967 | A | | 9/1993 | Daneshfar |
| 5,349,905 | A | | 9/1994 | Taylor et al. |
| 5,412,303 | A | | 5/1995 | Wernicki |
| 5,483,149 | A | | 1/1996 | Barrett |
| 5,502,361 | A | | 3/1996 | Moh et al. |
| 5,545,876 | A | | 8/1996 | Park |
| 5,550,637 | A | | 8/1996 | Murakami |
| 5,699,239 | A | | 12/1997 | Komori |
| 5,825,381 | A | | 10/1998 | Choo |
| 5,880,578 | A | | 3/1999 | Oliveira et al. |
| 5,978,285 | A | | 11/1999 | Ingalls |
| 5,994,671 | A | * | 11/1999 | Suzuki et al. ............... 219/216 |
| 6,035,357 | A | | 3/2000 | Sakaki |
| 6,061,259 | A | * | 5/2000 | DeMichele ................ 363/125 |
| 6,072,585 | A | | 6/2000 | Dutton et al. |
| 6,132,038 | A | | 10/2000 | Szlucha |
| 6,178,299 | B1 | | 1/2001 | Kim |
| 6,198,643 | B1 | | 3/2001 | Gray |

(Continued)

FOREIGN PATENT DOCUMENTS

JP 592819 12/1993

(Continued)

OTHER PUBLICATIONS

Japanese Office Action dated Nov. 11, 2005.

*Primary Examiner*—John H Le

(57) ABSTRACT

Embodiments of determining power to be supplied to the load using an expected voltage decrease that would result from supplying power to the load are disclosed.

18 Claims, 8 Drawing Sheets

U.S. PATENT DOCUMENTS

| | | | | |
|---|---|---|---|---|
| 6,208,258 | B1 | 3/2001 | Redilla | |
| 6,243,626 | B1 | 6/2001 | Schanin | |
| 6,246,842 | B1 | 6/2001 | McClure | |
| 6,396,674 | B1 | 5/2002 | Chen et al. | |
| 6,415,244 | B1 | 7/2002 | Dickens et al. | |
| 6,418,002 | B1 | 7/2002 | Yang et al. | |
| 6,459,175 | B1 | 10/2002 | Potega | |
| 6,465,987 | B1 | 10/2002 | Haas et al. | |
| 6,496,665 | B2 | 12/2002 | Umezawa et al. | |
| 6,528,957 | B1 | 3/2003 | Luchaco | |
| 6,591,073 | B1 | 7/2003 | Fujii | |
| 6,601,001 | B1 | 7/2003 | Moore | |
| 6,784,756 | B2 * | 8/2004 | Villella | 331/176 |
| 6,868,623 | B2 | 3/2005 | Bjornberg | |
| 7,142,993 | B2 * | 11/2006 | Smith et al. | 702/61 |
| 7,166,989 | B2 * | 1/2007 | Maskatia et al. | 320/128 |
| 2002/0097286 | A1 * | 7/2002 | Yasuda | 347/12 |
| 2002/0140964 | A1 | 10/2002 | Goto et al. | |
| 2002/0167824 | A1 * | 11/2002 | Boeke et al. | 363/24 |
| 2002/0188876 | A1 | 12/2002 | Forbes et al. | |
| 2003/0085621 | A1 | 5/2003 | Potega | |
| 2003/0202813 | A1 | 10/2003 | Schoedinger | |
| 2004/0003299 | A1 | 1/2004 | Malueg et al. | |
| 2004/0003300 | A1 | 1/2004 | Malueg et al. | |
| 2004/0028422 | A1 | 2/2004 | Umezawa et al. | |
| 2004/0039960 | A1 | 2/2004 | Kassayan | |
| 2004/0084971 | A1 | 5/2004 | Shukla et al. | |
| 2004/0095115 | A1 | 5/2004 | Kernahan et al. | |
| 2004/0139038 | A1 | 7/2004 | Ehlers et al. | |
| 2004/0184208 | A1 | 9/2004 | Liu | |
| 2005/0237370 | A1 | 10/2005 | Elgee et al. | |
| 2005/0278556 | A1 | 12/2005 | Smith et al. | |
| 2006/0292012 | A1 * | 12/2006 | Brudevold et al. | 417/53 |
| 2008/0103609 | A1 * | 5/2008 | Smith | 700/22 |

FOREIGN PATENT DOCUMENTS

| | | |
|---|---|---|
| JP | 11138950 | 5/1999 |
| JP | 2000033751 | 2/2000 |
| JP | 2001088402 | 4/2001 |
| WO | WO02/10861 | 2/2002 |

* cited by examiner

DETERMINING POWER

BACKGROUND

Drawing power from an AC mains may result in a reduction in the voltage provided by the AC mains. The reduction in the voltage provided by the AC may interfere with the proper operation of assemblies configured to operate using power from the AC mains.

DESCRIPTION OF THE DRAWINGS

Shown in FIG. 1 is a representation of an embodiment of a system.

Shown in FIG. 2 is a graph showing an embodiment of a relationship.

Figure 3A:
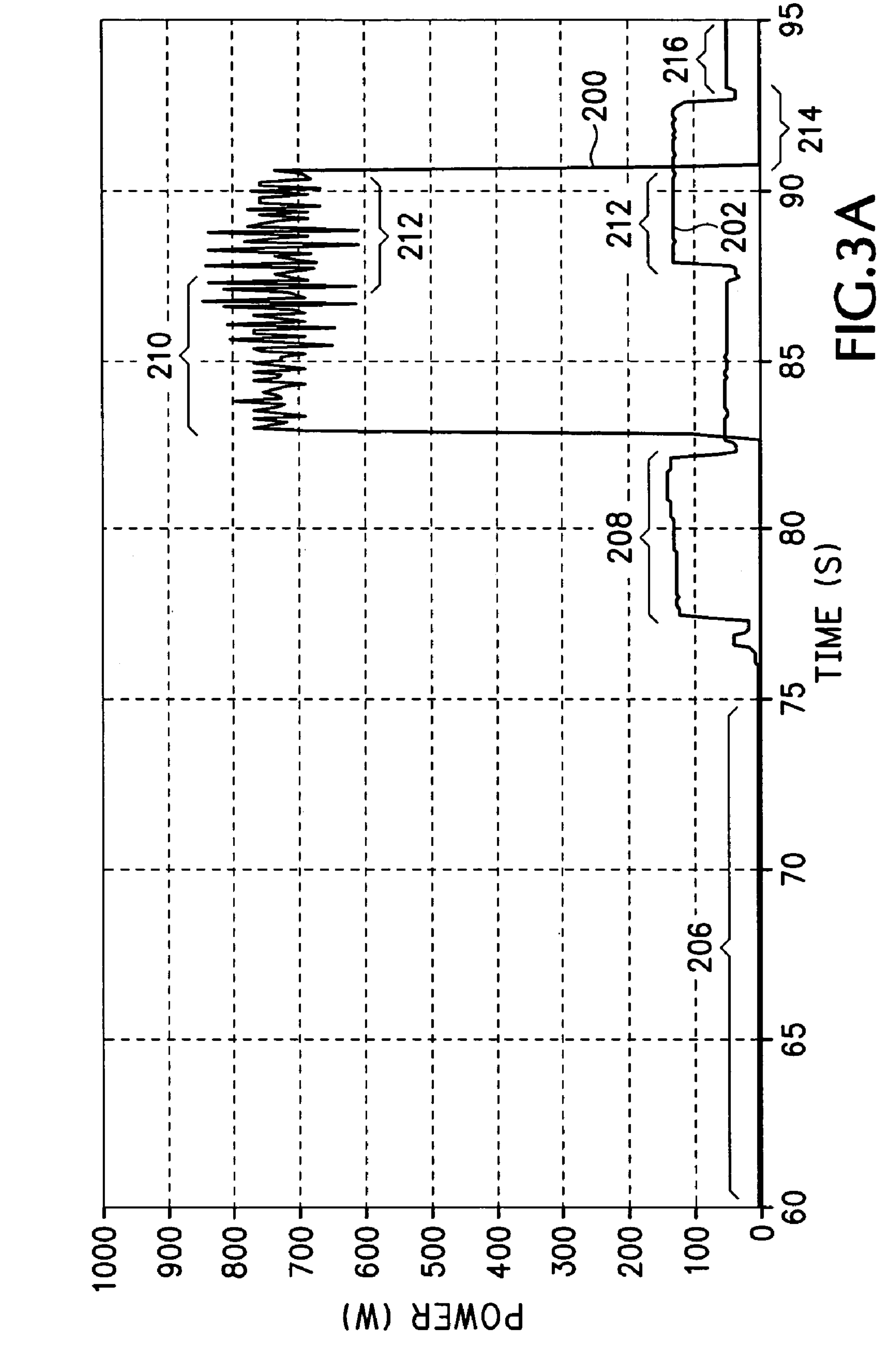
Figure 3B:
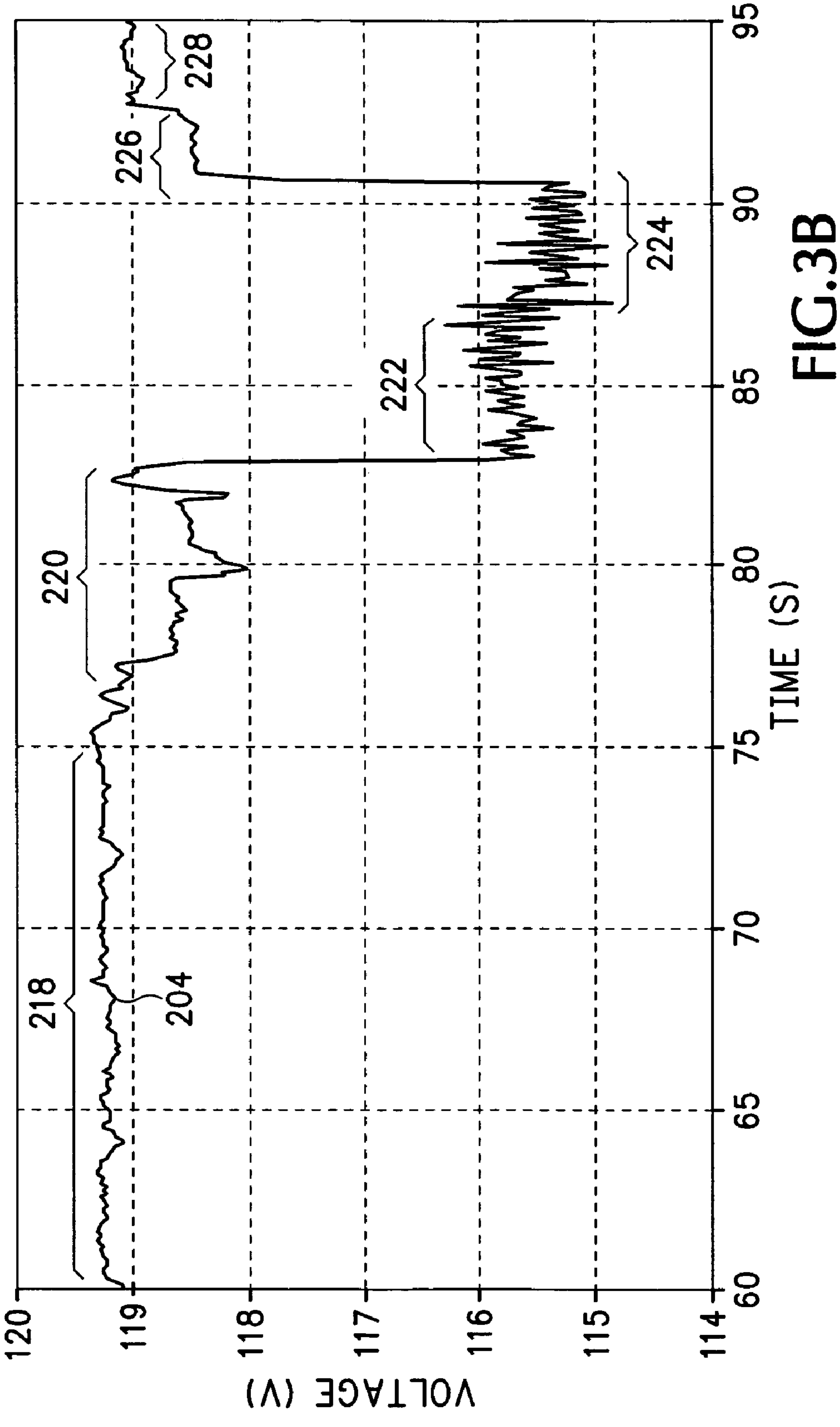

Shown in FIGS. 3A and 3B are embodiments of relationships.

Figure 4A:
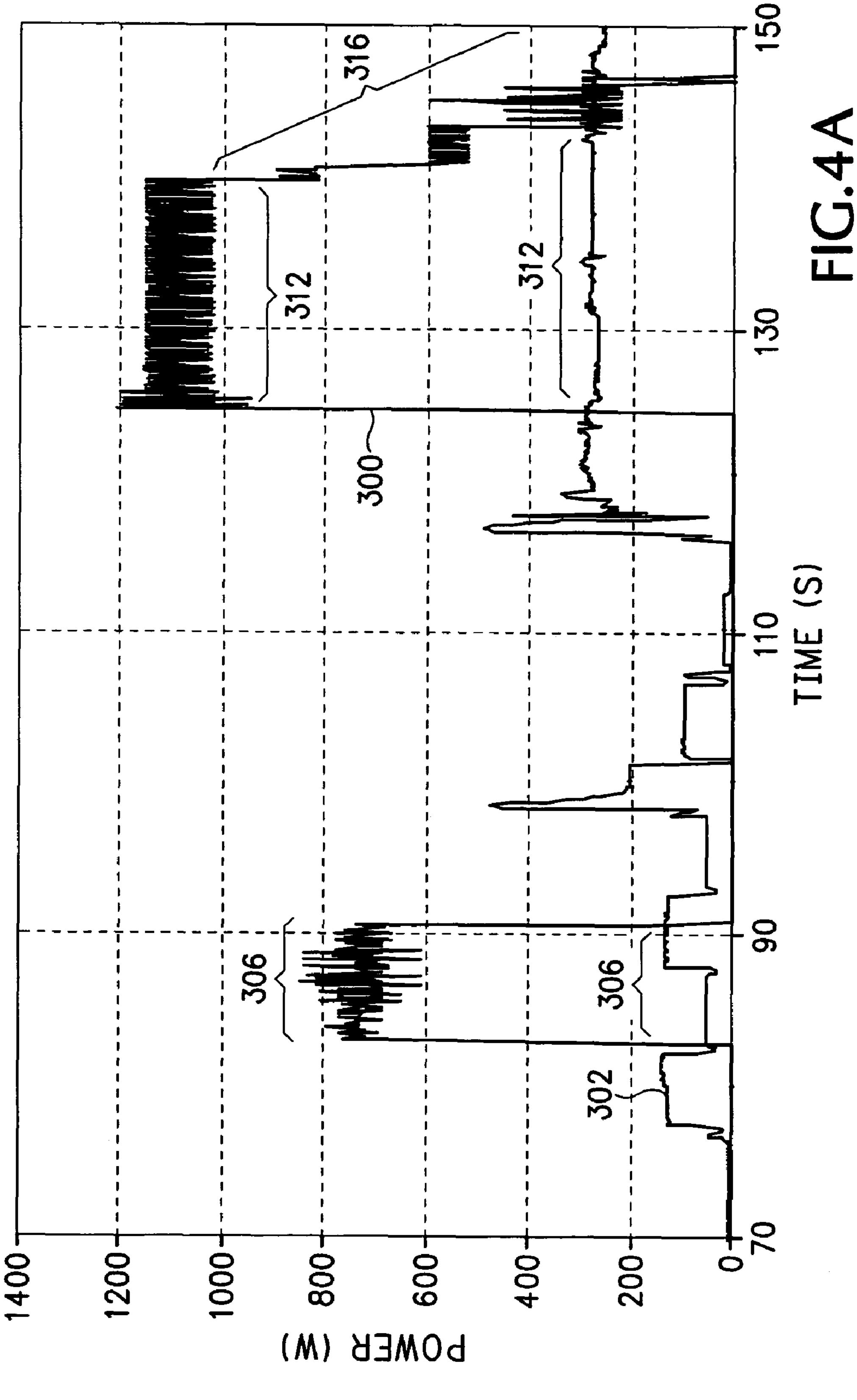
Figure 4B:
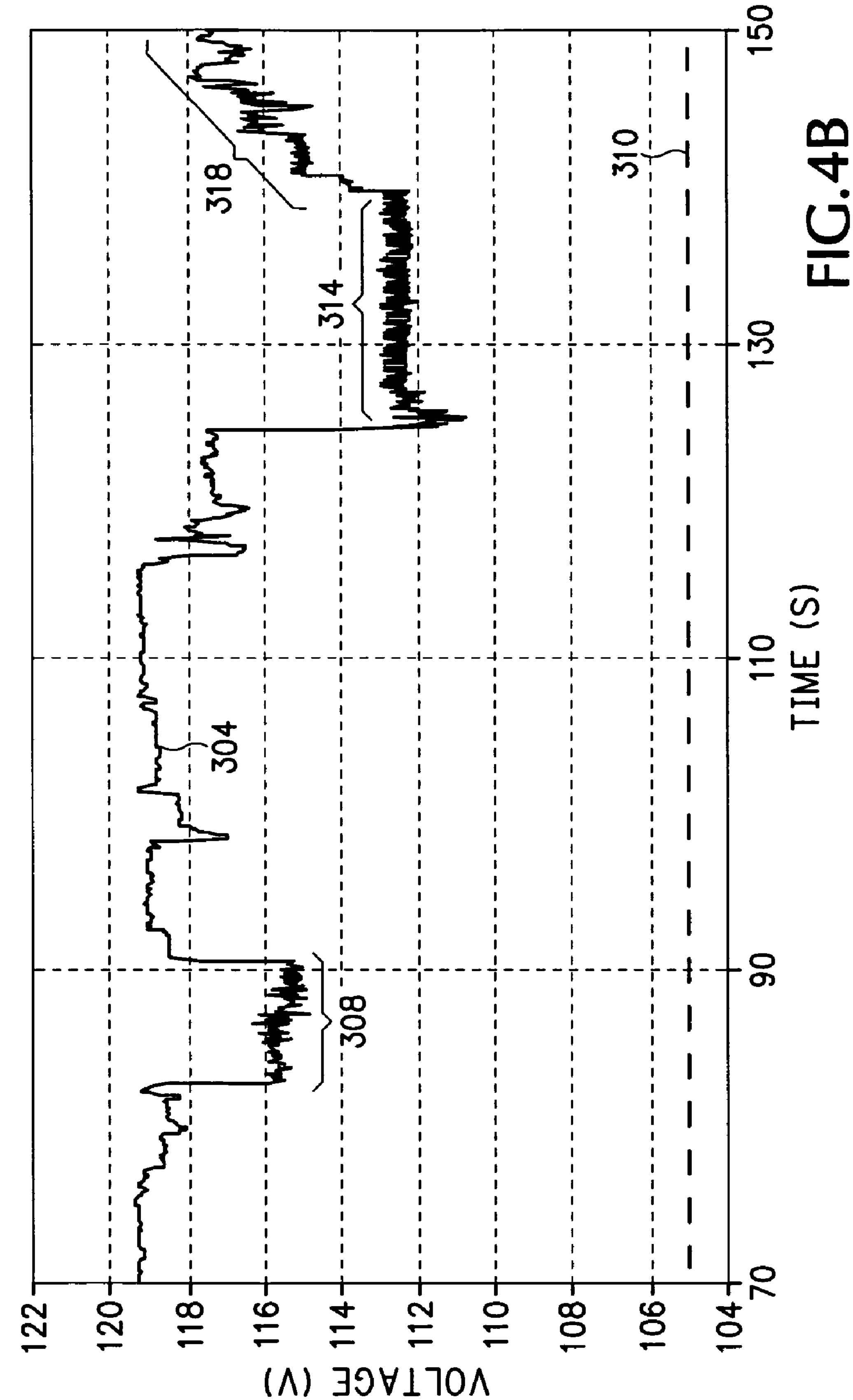

Shown in FIGS. 4A and 4B are graphs representing operation of an embodiment of a system.

Figure 5:
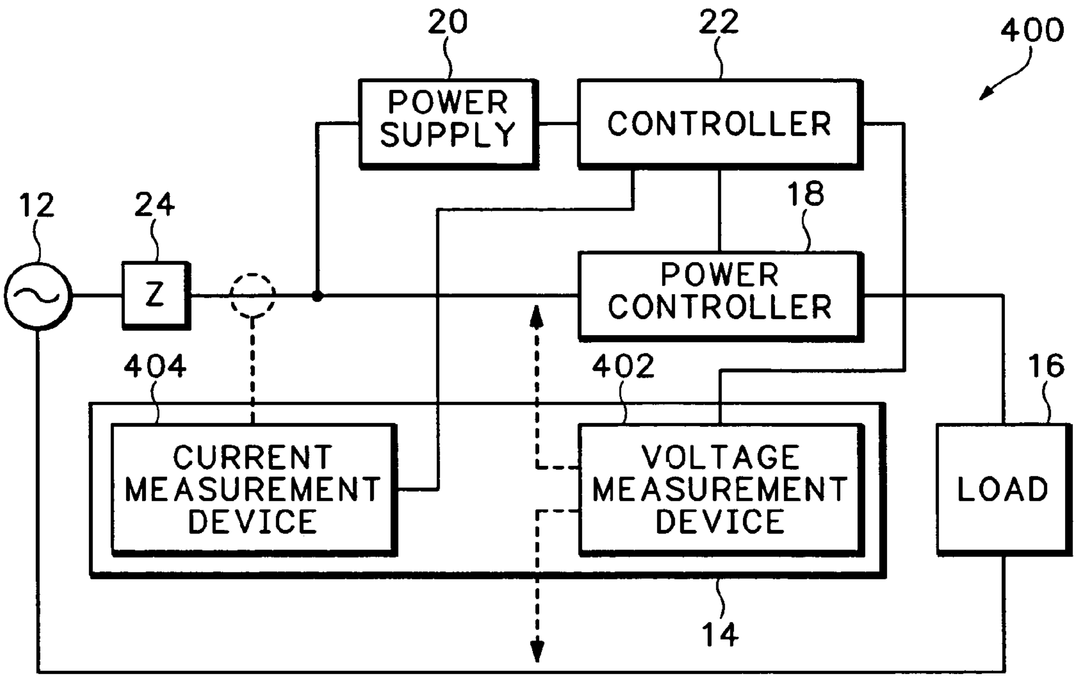

Shown in FIG. 5 is an embodiment of a system.

Figure 6:
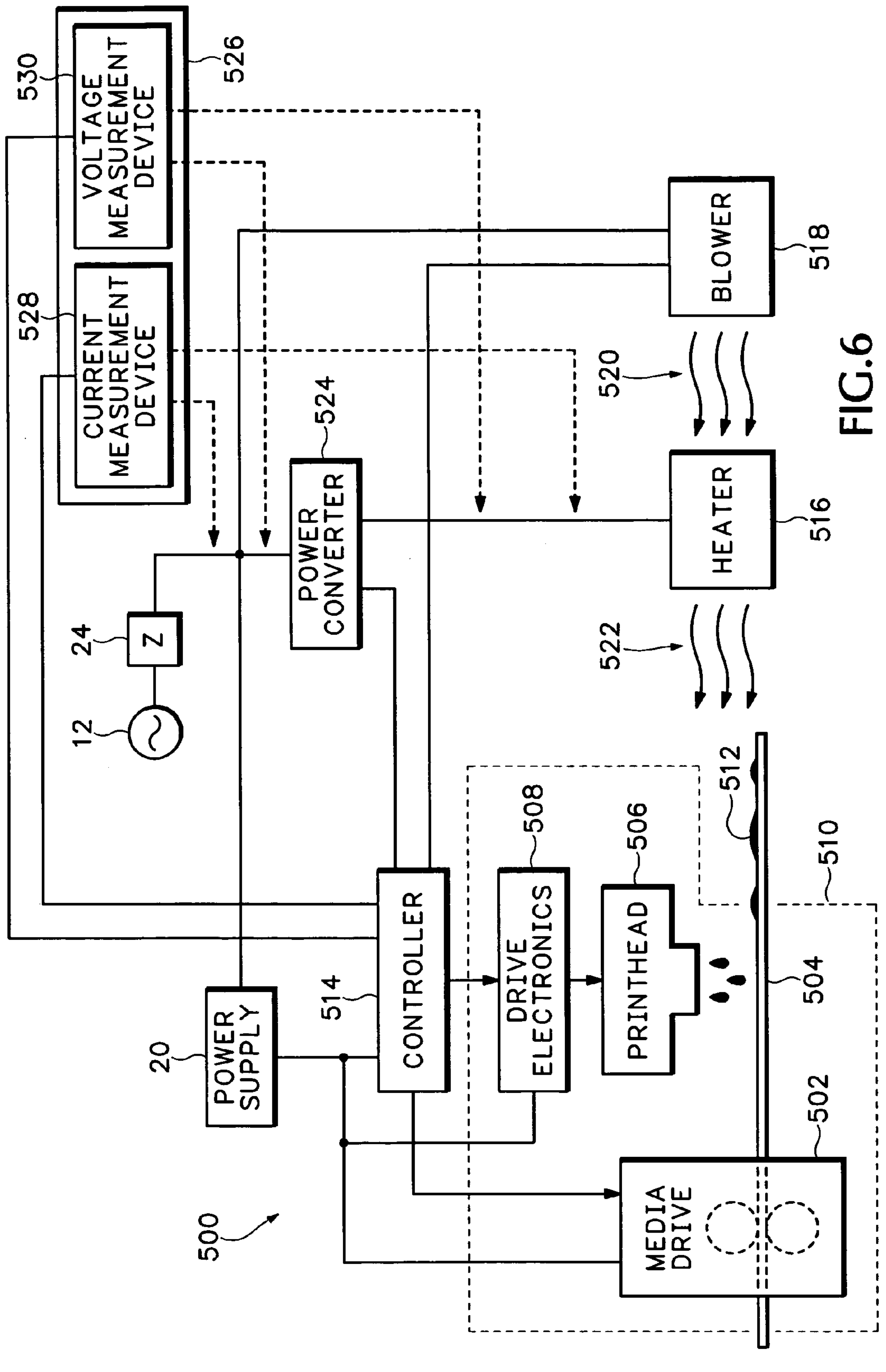

Shown in FIG. 6 is an embodiment of an image forming system.

Figure 7:
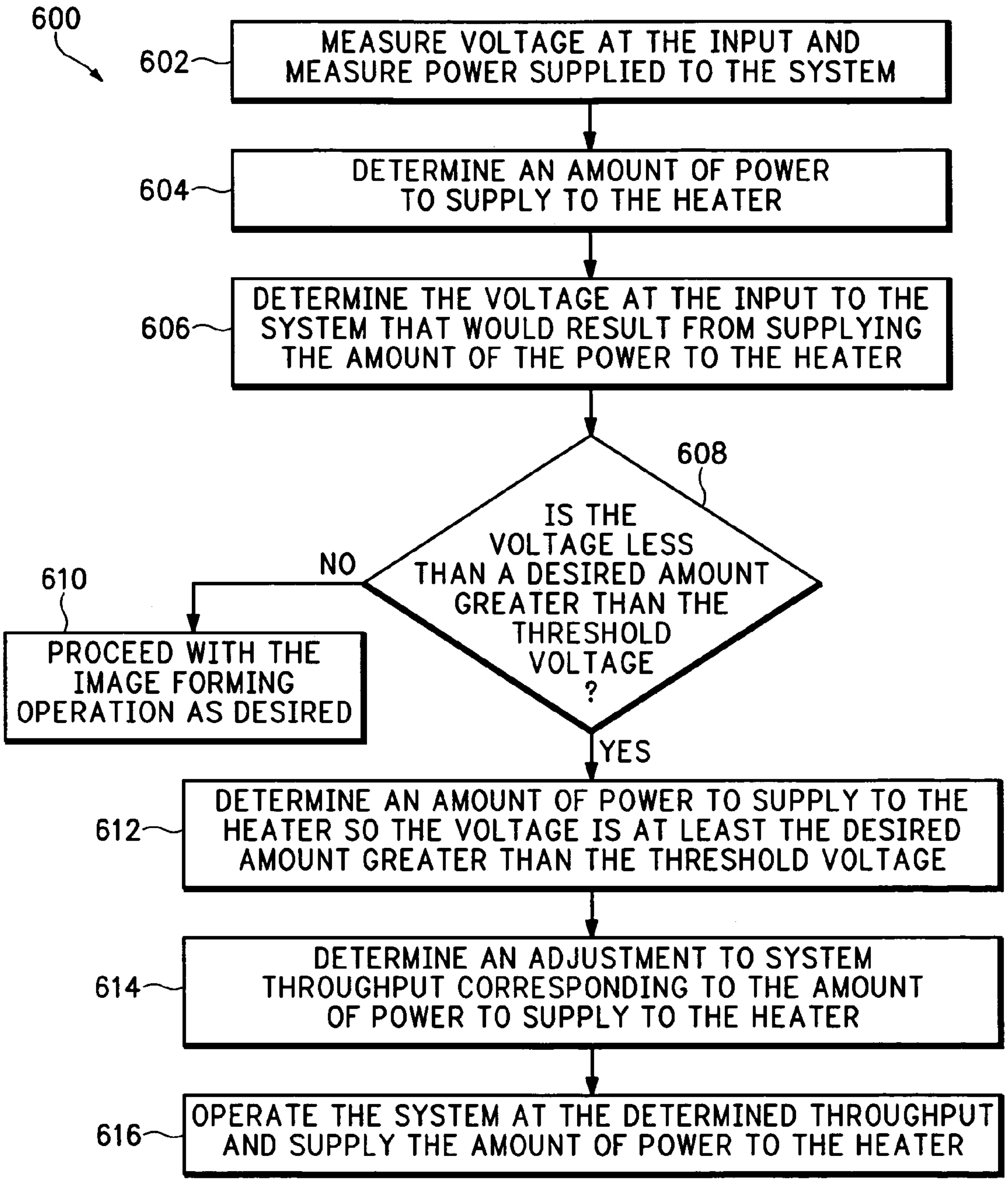

Shown in FIG. 7 is an embodiment of a method.

DETAILED DESCRIPTION

Figure 1:
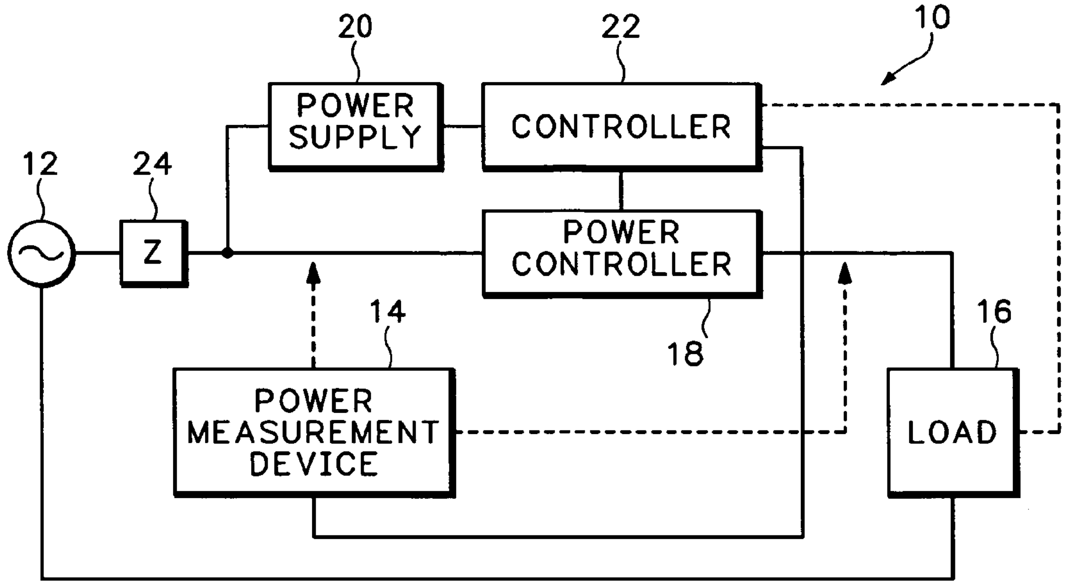

Shown in FIG. 1 is a simplified block diagram representation of an embodiment of a system, such as system 10. An embodiment of a power source, such as power source 12, may supply power to system 10 during operation. In one embodiment, power source 12 includes an AC power source, in some embodiments an AC mains that may provide an AC line voltage such as 110 VRMS to 120 VRMS or 220 VRMS to 240 VRMS. An embodiment of a power measurement device, such as power measurement device 14, may, in one embodiment, be configured to provide an estimate of the power supplied by power source 12 or, in another embodiment, configured to provide an estimate of the power supplied to an embodiment of a load, such as load 16 (with measurement of these different powers depicted by the dashed lines terminated in arrows in FIG. 1). Providing an estimate of the power by making either of these measurements may give an indication of the power usage of load 16. Load 16 may be any device or apparatus that receives power provided by an embodiment of a power controller, such as power controller 18. In some embodiments, power controller 18 may include a switching device, such as a triac or a MOSFET, which operates to control the power provided to load 16 from power source 12. In other embodiments, power controller 18 may include another type of power regulating device to affect the power provided to load 106. Power supply 20 is used to supply power to various assemblies included within system 10. An embodiment of a processing device, such as controller 22, is configured to direct power controller 18 to provide an amount of power to load 16, which may be a targeted or intended amount of power that it is desired to supply to load 16. Power measurement device 14 provides the estimate of the power usage of the system 10 and/or of load 16 to controller 22. In one embodiment, power measurement device 14 may be implemented using components such as the ADE7753 or the ADE7755, available through Analog Devices Corporation.

Impedance 24 (labeled Z in FIG. 1) represents the impedance associated with the power source 12. With respect to the voltage provided at the input of system 10, impedance 24 may be regarded as included within power source 12. Impedance 24 may represent the resistance between power source 12 and system 10 and the reactance, such as inductive reactance, contributed by power source 12 and the conductors coupling power source 12 to system 10. The current drawn by system 10 from power source 12 during operation may result in a voltage drop across impedance 24 of magnitude sufficient to cause some difficulty in the operation of assemblies or devices within system 10, such as power supply 20. For example, consider an embodiment of power supply 20 that includes a DC power supply, such as a switching power supply. This embodiment of power supply 20 may have a range of operating input voltage at the input of system 10 and provided by power source 12 for which power supply 20 is able to properly operate to provide output voltages within a specified range. Outside of this range of input voltage from power source 12, power supply 20 may not provide output voltages within the specified range.

For the case in which power supply 20 includes a switching power supply, a decrease in the voltage provided to the input of power supply 20 (such as that that may result from the voltage drop across impedance 24 when system 10 is drawing a sufficiently large current) of sufficient magnitude may result in the switching power supply stopping operation. As a result, this may interfere with the desired operation of system 10. If the voltage drop across impedance 24 is sufficiently large, the voltage present on the primary storage capacitors on the line side of the switching power supply would not have sufficient voltage for proper operation of the switching power supply.

Various factors could occur singly or in combination that might bring about this result. For example, the resistive component of impedance 24 may be sufficiently large for the range of currents that system 10 will draw that, even with power source 12 providing a voltage within the normal expected range around the nominal voltage of power source 12 (such as 120 VRMS or 240 VRMS), the voltage present at the input to power supply 20 may drop below a value specified for proper operation of power supply 20. This result could come about because of particular characteristics of power source 12 or the hardware used to connect power source 12 to system 10 (which may contribute to the magnitude of impedance 24) or a combination of the characteristics of the hardware and the power source alone or along with other factors.

Consider, for example a circuit used for delivering power from power source 12 to system 10. In some installations this circuit may include conductors, such as copper wire, sized for safely carrying up to 15 amps RMS continuously during operation of system 10. For these types of circuits a 15 amp circuit breaker may be used in the circuit along with 14 gauge wire. In other installations, the circuit may include conductors sized for safely carrying up to 20 amps RMS continuously during operation of system 10. For these types of circuits a 20 amp circuit breaker may be used in the circuit along with 12 gauge wire. In other types of circuits, other sizes of circuit breakers, of larger or smaller current carrying capacity than 15 amps of 20 amps, may used. In other types of circuits, other gauges of wire, of larger or smaller gauge than 12 gauge or 14 gauge, may be used. The resistance in series with power source 12 (that contributes to a resistive component to impedance 24) increases with the length of the conductors from power source 12 to system 10 and, for a given length of these conductors, increases as the gauge of the wire used for the conductors increases.

Another possible source contributing to the resistance component of impedance 24 can result from the resistance associated with connections included in the circuit used for delivering power from power source 12 to system 10. The resistance associated with these connections may include, for example, a resistance of terminal connections (which may be screw type and/or clamping type) of the circuit breaker (or fuse) to which the conductors in the circuit are connected, a resistance between the contacts of a wall plug receptacle and a power cord of system 10, and a resistance of the terminal connections of the wall plug receptacle to which the conductors in the circuit are connected. Depending upon the particulars of the circuit used to deliver power from power source 12 to system 10, there may be additional sources of resistance that contribute to the resistive component of impedance 24 or there may be fewer sources of resistances that contribute to the resistive component of impedance 24.

Figure 2:
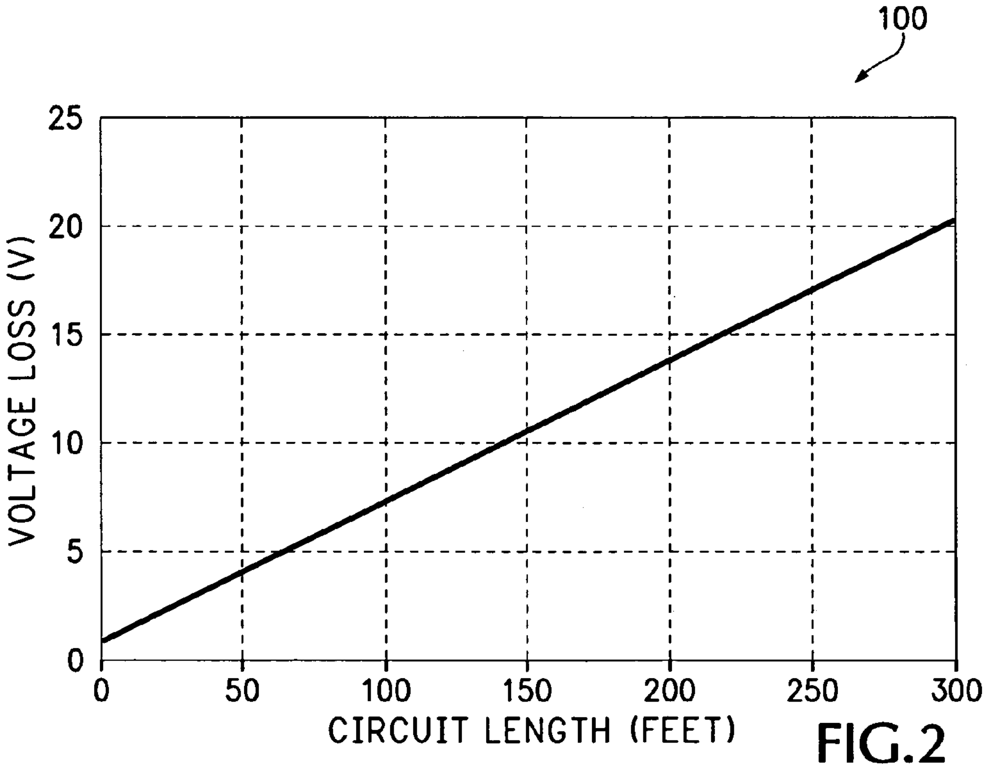

Shown in FIG. 2 is an embodiment of a relationship in graph 100 that may exist between a voltage drop across a conductor in a circuit, as a function of the length of the conductor for a substantially constant value of current flowing through the conductor. The conductors in the circuit corresponding to the data of FIG. 2 include those connecting the circuit breaker to the wall plug receptacle and the power cord of the device drawing the current. The data of FIG. 2 corresponds to a situation for which approximately 20 amps would flow through 12 gauge wire used for the conductors. As can be seen from line 102, a significant voltage drop can result at this value of current from the resistance of the conductors in the circuit.

Consider the case for which power source 12 includes an AC power source, such as the AC mains available in commercial or residential installations, which should provide a nominal voltage of 120 VRMS but actually provides less voltage, such as, for example, 108 VRMS. This drop from the nominal value in the voltage provided may come about because of loads on the power system at locations other than the particular commercial or residential installation of interest, or because of power generation difficulties with the power system, or some combination of these factors or other factors. Consider the case in which power supply 20 will not correctly operate below a threshold RMS value of the voltage, such as 105 VRMS, on its input. For example, if the RMS magnitude of the AC input voltage to an embodiment of power supply 20 drops below the threshold, the embodiment of power supply 20 may enter a shut down mode. Or, another embodiment of power supply 20 may, if the RMS input voltage drops below the threshold, cease to maintain output voltages of the embodiment of power supply 20 within specified values for certain ranges of loading. With 108 VRMS supplied by the AC mains to the installation, FIG. 2 suggests that with approximately at least 20 amps and approximately at least 125 feet of conductor length, the AC RMS voltage at the input to system 10 by power source 12 will result in the voltage below the threshold of 105 VRMS for proper operation of this embodiment of power supply 20. As is shown by this example, in some circumstances in which system 10 may operate, the characteristics of power source 12 (such as the value of impedance 24 that may be influenced by the length of conductors used and the resistance of connections) may be such that system 10 will not operate properly where an amount of power drawn by system 10 is above a threshold amount. It should be recognized that other combinations of power drawn by system 10 and voltage provided by power source 12 could result in the AC RMS voltage at the input to power supply 20 dropping below the voltage threshold for proper operation of power supply 20.

There other characteristics of power source 12 that may contribute to the AC RMS voltage at the input to power supply 20 dropping below the threshold for proper operation of power supply 20. The reactance associated with impedance 24 may contribute to transient variations in the AC voltage provided by power source 12 that could interfere with the proper operation of power supply 20. For example, if the impedance 24 associated with power source 12 included a sufficiently large inductive component, changes in the power drawn by system 10 could result in time varying voltage transients in power source 12 of sufficiently low frequency so that the voltage provided to the input of power supply 20 is at a low value for a sufficiently long time interval such that the primary storage capacitors that may be included in an embodiment of power supply 20 discharge to a voltage at which power supply 20 enters a shut down mode.

The power drawn by system 10 may vary with time. Changing modes of operation of one or more of the assemblies or devices dissipating power within system 10 may change the power drawn by system 10 from power source 12. For example, some embodiments of load 16 may operate in a time varying fashion. Controller 22 may include a configuration to control the operation of power controller 18 so that during certain time periods power is dissipated in load 16 and during other time periods substantially no power is dissipated in load 16. One embodiment of load 16 may include a heater having one or more heating elements. For these embodiments of system 10, controller 22 includes a capability to actuate load 16 (as indicated by the dashed line between controller 22 and load 16 in FIG. 1) to connect one or more of the heating elements into the circuit including power controller 18 so that power controller 18 can control the dissipation of power in the one or more heating elements. Causing the one or more heating elements included in load 16 to switch into or out of the circuit including power controller 18 results in the power drawn by system changing at times corresponding to when the one or more heating elements switch into our out of the circuit.

The power drawn by system 10 changing at various times results in a change in the current drawn by system 10 at the various times, a change in the voltage drop across impedance 24 at the various times, and a change in the voltage provided by power source 12 to the input of system 10 at the various times. As explained above, decreases in the voltage provided by power source 12 at the input of system 10 of sufficient magnitude may result in some assemblies or devices within system 10, such as power supply 20, ceasing to operate in a desired manner. By controlling the power dissipated by one or more assemblies or devices included with system 10 in view of the decreases that may occur in the voltage provided by power source 12 at the input of system 10, the likelihood of undesired operation of some assemblies or devices with system 10 may be reduced.

In one embodiment of system 10, controller 22 includes a configuration to operate power controller 18 to control the power dissipated in load 16 so that a range of amounts of power are dissipated in load 16. For different amounts of power dissipated in load 16, circuitry included within power measurement device 14 is used to measure the corresponding voltages provided at the input of system 10 by power source 12. In addition, for this embodiment of system 10, power measurement device 14 is configured to measure the power provided to system 10 by power source 12 for the different amounts of power dissipated in load 16. The process of making measurements of the voltage provided at the input of system 10 by power source 12 and the power provided to system 10 by power source 12 provides data to determine a relationship between the voltage provided by power source 12 and the power supplied by power source 12. As will be explained in further detail, the information provided by this relationship can be used to determine an adjustment to the power to be dissipated in one or more devices or assemblies, such as load 16, included within system 10 to reduce the likelihood that one or more of these devices or assemblies, such as power supply 20, does not operate as desired.

In another embodiment of system 10, power measurement device 14 is configured to measure the power dissipated in load 16. Along with measurements of the voltage provided at the input of system 10 by power source 12, this provides data to determine a relationship between the voltage provided by power source 12 and the power dissipated by load 16. As will be explained in further detail, the information provided by this relationship can be used to determine an adjustment to the power to be dissipated in one or more devices or assemblies, such as load 16, included within system 10 to reduce the likelihood that one or more of these devices or assemblies, such as power supply 20, does not operate as desired.

Shown in FIG. 3A and FIG. 3B are graphs showing an embodiment of a relationship between a voltage provided by an embodiment of an AC power source 12 and power dissipated in various loads included within system for an embodiment of system 10. In FIG. 3A, trace 200 represents the power dissipated in a load included within the embodiment of system 10, such as in load 16, with respect to time. Also in FIG. 3A, trace 202 represents the power dissipated in a second load included within system 10, such as power supply 20, with respect to time. Shown in FIG. 3B is a graph showing changes in the voltage provided by AC power source 12 with respect to a period of time corresponding to that of FIG. 3A. Trace 204 represents the voltage provided by AC power source 12 at the input to system 10.

As can be generally observed from the disclosed relationship between the voltage provided by AC power source 12 and the power dissipated by devices and assemblies included in the embodiment of system 10, an increase in power dissipated within system 10 results in a corresponding decrease in the voltage provided by AC power source 12 and a decrease in power dissipated within system 10 results in a corresponding increase in the voltage provided by AC power source 12. Additionally, the power dissipated in load 16 can be substantially greater than that of power supply 20 and so operation of load 16 will likely have a greater influence of the voltage provided by AC power source 12 than will power supply 20. Consider regions 206, 208, 210, 212, 214, and 216 of traces 200 and 202 and corresponding regions 218, 220, 222, 224, 226 and 228 of trace 204. Regions 206 and 218 correspond to no or substantially no power dissipation in load 16 or power supply 20. Regions 208 and 220 correspond to power dissipation in power supply 20 but not load 16. Regions 210 and 222 correspond to power dissipation in load 16 but not power supply 20. Regions 212 and 224 correspond to power dissipation in both load 16 and power supply 20. Regions 214 and 226 correspond to power dissipation in power supply 20 but not load 16. Regions 216 and 228 correspond to no power dissipation in load 16 and substantially reduced power dissipation in power supply 20.

Measurement of the powers dissipated in load 16 and power supply 20 and the voltage provided by AC power source 12 for these corresponding regions of traces 200, 202 and 204 provides data specifying a relationship between the power supplied to this embodiment of system 10 and the voltage provided by AC power source 12. These measurements may be stored in an embodiment of a computer readable medium, such as memory, included within controller 22 for use in determining how controller 22 is to cause power controller 18 to control the power dissipated in load 16 so that the voltage will not likely drop below a threshold for proper operation of power supply 20.

Shown in FIG. 4A and FIG. 4B are graphs representing operation of an embodiment of system 10 in a manner to adjust the power dissipated in load 16 so that the input voltage to power supply 20 is less likely to drop below a threshold for proper operation of power supply 20. In FIG. 4A, trace 300 represents the power dissipated in load 16 and trace 302 represents the power dissipated in the other devices and assemblies in system 10, including power supply 20. In FIG. 4B, trace 304 represents the voltage provided by AC power source 12 at the input of system 10. Consider regions 306 and 308 of traces 300, 302, and 304. In region 306, the power dissipated in load 16 has experienced a step change in value. However, the resulting change in the voltage provided by AC power source 12 remains above the threshold 310 for proper operation of power supply 20 by a desired amount because the sum of powers represented by regions 306 is not sufficiently large.

Next consider regions 312 and 314 of traces 300, 302, and 304. While operation of system 10 corresponds to regions 312, the voltage supplied by AC power source 12 at the input to system 10 corresponds to region 314. In region 314, the voltage provided by AC power source 12 has dropped below a desired amount above the threshold 310 for proper operation of power supply 20 because of the sum power the powers represented by regions 312. In response, controller 22 determines an adjustment to be made to the power dissipated in load 16 so that the voltage provided by AC power source 12 to the input of system 10 is a desired amount above the threshold 310. In making this determination, controller 22 makes use of the relationship between the voltage provided by AC power source 12 to the input of system 10 and the power supplied to the system 10 as discussed in a previous paragraph. Then, controller 22 causes power controller 18 to reduce the power dissipated in load 16 (as indicated in region 316) with an increase in the voltage provided by AC power source 12 at the input of system 10 results (as indicated by region 318).

Shown in FIG. 5 is an embodiment of system 10, system 400. System 400 includes an embodiment of power measurement device 14 having a voltage measurement device 402 and a current measurement device 404. Voltage measurement device 402 is configured to measure the voltage provided by AC power source 12 at the input to system 400. The measurements of this voltage provided by voltage measurement device 402 may be used in determining the voltage-power relationship previously mentioned as well as be used in determining, with the current measurements provided by the current measurement device 404, the power provided by AC power source 12 to system 400. In one embodiment, current measurement device 404 could be implemented using a current sense resistor with an amplifier and an A to D converter or with a device to sense a magnetic field resulting from the current to be measured, an amplifier, and an A to D converter. In one embodiment, voltage measurement device 402 could be implemented using a voltage divider, an amplifier and an A to D converter.

Shown in FIG. 6 is an embodiment of an image forming system, such as an embodiment of an inkjet printing system, inkjet printing system 500, shown in a simplified form for ease of illustration. Inkjet printing system 500 may beneficially make use of the techniques described previously described to reduce the likelihood that drops in the voltage supplied by AC power source 12 to inkjet printing system 500 will result in improper operation one or more of devices or assemblies included within inkjet printing system 500.

Ink jet printing system 500 includes an embodiment of a media movement mechanism, media drive 502, to move media, such as a unit of media 504, from a media storage bin (not shown in FIG. 6) past an embodiment of a colorant ejection device, such as printhead 506 during an image forming operation. Printhead 506 represents, as may be used in various embodiments of ink jet printing system 500, an array of one or more printheads. For ease of illustration, media drive 502 is shown as present at one location in the media path. However, in other embodiments, structure associated with media drive 502 may be located at various places within ink jet printing system 500 to perform the function of moving media within ink jet printing system 500. As unit of media 504 moves past printhead 506, colorant, such as ink 512, is ejected onto unit of media 504 to form an image corresponding to image data received by inkjet printing system 500. Signals provided to printhead 506 cause ejection of the ink 512 from printhead 506 to form the image. Drive electronics 508 generate the signals to cause printhead 506 to eject the ink 512 to form the image.

In inkjet printing system 500, media drive 502, printhead 506, and drive electronics 508 are included as part of an embodiment of an image forming mechanism, such as inkjet image forming mechanism 510. Other embodiments of an image forming mechanism may be configured for operation employing other types of image forming techniques. For example, an embodiment of an image forming mechanism, such as an electrophotographic image forming mechanism, may be suitably configured to use electrophotography to form an image on unit of media 504. An embodiment of an electrophotographic image forming mechanism may an include a laser scanner to emit a laser beam that can be selectively pulsed and moved relative to the surface of a photoconductor to form a latent electrostatic image on the photoconductor. Additionally, the electrophotographic image forming mechanism may include a charge roller to charge the surface of the photoconductor for selective discharge by the laser beam, and a developing unit that contains toner to be developed onto the latent electrostatic image and subsequently transferred to unit of media 504.

Various devices within inkjet printing system 500 may be supplied by power supply 20. An embodiment of a processing device, such as controller 514, provides data, formed using the image data, to drive electronics 508 to generate the signals provided to printhead 506. In various embodiments, controller 514 may include a microprocessor executing firmware or software instructions to accomplish its tasks. Or, controller 514 may be included in an application specific integrated circuit (ASIC), formed of hardware and controlled by firmware specifically designed for the tasks it is to accomplish. Furthermore, in alternative embodiments, the functionality associated with controller 514 may be distributed across one or more other devices included within inkjet printing system 500.

The software or firmware may be stored on an embodiment of a computer-readable media included within or separate from controller 514. A computer readable medium can be any media that can contain, store, or maintain programs and data for use by or in connection with the execution of instructions by a processing device. Computer readable media can comprise any one of many physical media such as, for example, electronic, magnetic, optical, electromagnetic, infrared, semiconductor media, or any other suitable media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc. Computer readable media may also refer to signals that are used to propagate the computer executable instructions over a network or a network system such as the Internet.

Controller 514 may include a configuration to provide signals to media drive 502 to influence the movement of media through ink jet printing system 500 for accomplishing the image formation operation. Furthermore, an embodiment of circuitry included within controller 514 includes a configuration to provide one or more signals that influence the operation of an embodiment of a heater, such as heater 516. Heater 516 may include an embodiment of a heating element that contributes to the heating of air near heater 516. An embodiment of an air movement device or mechanism, such as blower 518, may push air 520 toward heater 516 so that heat may be transferred from heater 516 to air 520. As air 520 moves past heater 516 on its way toward unit of media 504, heat is transferred to air 520. The heated air 522 continues to move from heater 516 toward unit of media 504. Heated air 522 passing over unit of media 504 provides energy to vaporize at least part of the fluid included in ink 512 deposited onto unit of media 504. In one embodiment, air including the vaporized portions of the fluid is discharged from ink jet printing system 500.

For an embodiment of an image forming system corresponding to an electrophotographic printing system, the embodiment of the heater would correspond to a device to fuse toner to media, such as a fuser. In the electrophotographic printing system, an embodiment of circuitry would include a configuration to provide one or more signals that influence the operation of the fuser.

Power is supplied to heater 516 by an embodiment of a power controller, such as power converter 524. Power converter 524 could be implemented using a wide variety of techniques, similar to the possibilities described for power controller 18. In one embodiment, power converter 524 is configured to attempt to supply an amount of power to heater 516 as directed by the operation of the embodiment of the circuitry included within controller 514. The one or more signals provided by the embodiment of the circuitry included within controller 514 to power converter 524 may be a digital value that is used by power converter 524 to attempt to supply the amount of power to heater 516 appropriate for a particular operation performed by ink jet printing system 500, such as vaporizing at least part of the fluid included in ink 512. In one embodiment, the digital value could be stored in a register included in an embodiment of power converter 524. The digital value may influence the rate at which a switching device included within power converter 524 operates. The amount of the power that the embodiment of the circuitry within controller 514 directs power converter 524 to provide to heater 516 is related to the image forming operations performed by inkjet printing system 500. For example, with deposition of ink 512 onto unit of media 504, the embodiment of the circuitry within controller 514 may direct power converter 524 to provide an amount of power to heater 516 suitable for vaporization of at least part of the fluid included within ink 512.

An embodiment of a power measurement device, such as power measurement device 526, may be used to measure one or more parameters associated with the operation of inkjet printing system 500 to provide an estimate of the power supplied to inkjet printing system 500. As indicated in FIG. 6, power measurement device 526 may be coupled to controller 514. Power measurement device 526 includes an embodiment of a current measurement device, such as current measurement device 528, and an embodiment of a voltage measurement device, such as voltage measurement device 530. Current measurement device 528 and voltage measurement device 530 provide the estimate of the power supplied as signals related to the measurement of, respectively, current and voltage.

The embodiment of circuitry included within controller 514 may be configured to determine a relationship between the voltage provided by AC power source 12 at the input of inkjet printing system 500 and the power supplied to inkjet printing system 500 by AC power source 12. This may be accomplished in various ways through the operation of the embodiment of the circuitry. In general, controller 514 may cause power converter 524 to supply different amounts of power to heater 516 with measurement of the voltage provided by AC power source 12 at the input of inkjet printing system 500 and current provided by AC power source 12 to inkjet printing system 500 during time periods when the different amounts of the power are supplied to heater 516. From these measurements of voltage and current, the embodiment of the circuitry may determine, such as by computation using the measurements of voltage and current, the power supplied by AC power source 12 to inkjet printing system 500. The values of the power supplied to inkjet printing system 500, for the corresponding amounts of power supplied to heater 516, are stored in memory included in controller 514, along with the corresponding voltages supplied by AC power source 12 at the input to inkjet printing system 500. Thus, a relationship between the voltage provided by AC power source 12 at the input to inkjet printing system 500 and power supplied by AC power source 12 to inkjet printing system 500 is determined.

In an alternative embodiment, a power measurement device is configured to measure the power supplied to heater 16 and a voltage measurement device is configured to measure the voltage provided by AC power source 12 at the input to inkjet printing system 500. The measured values of power and voltage are stored in the memory included in controller 514. This determines another type of relationship between the voltage provided by AC power source 12 at the input to inkjet printing system 500 and power supplied by AC power source 12 to inkjet printing system 500

Shown in FIG. 7 is an embodiment of a method 600 for operating inkjet printing system 500. During operation of inkjet printing system 500 to form images on units of media 504, heater 516 may be operated to assist in removing fluid from ink 512 ejected onto media 504. Prior to supplying power to heater 516, an embodiment of controller 514 causes 602 measurement of voltage provided by AC power source 12 at the input to inkjet printing system 500 using voltage measurement device 530. In addition, controller 514 causes measurement of the power supplied by AC power source 12 to inkjet printing system 500 using power measurement device 526. Then, controller 514 determines 604, an amount of power to supply to heater 516 to vaporize fluid included in ink 512 sufficiently fast to meet the desired rate of image forming throughput in inkjet printing system 500.

Next, controller 514, using a voltage-power relationship as described in the previous paragraphs and the measurement of voltage and power made previously, determines 606 the voltage that would be provided by AC power source 12 at the input to inkjet printing system 500 if heater 516 were supplied with the amount of power to meet the desired rate of image forming throughput. Then, controller 514 determines 608 if this voltage would be less than a desired amount greater than a threshold voltage for proper operation of power supply 20. If the voltage would not be less than the desired amount above the threshold voltage, controller 514 causes 610 the image forming operation to proceed at the desired rate with application of the desired amount of power to heater 516.

If the voltage would be less than the desired amount greater than the threshold voltage, controller 514 determines 612, using the determined voltage power relationship, the amount of power to supply to heater 516 so that the voltage provided by AC power source is at least the desired amount greater than the threshold voltage for proper operation of power supply 20 is determined. Next, controller 514 determines 614 the adjustment to the operation of inkjet printing system 500 so that the throughput of the image forming operation is compatible with the amount of power to supply to heater 516 determined. Then, controller 514 causes 616 power converter 524 to supply heater 516 at least substantially with the determined amount of power and causes 616 inkjet printing system 500 to operate with a throughput compatible with the amount of power supplied to heater 516.

The determination 606 could be performed in several ways in various embodiments of controller 514. For example, controller 514 could be configured to interpolate between or extrapolate from, as is appropriate, the previous measurements that specify the voltage-power relationship to determine an estimate of the voltage that would be provided at the input of inkjet printing system 500 by AC power source 12 if the desired amount of power were to be supplied to heater 516. Or, another embodiment of controller 514 could be configured to use the previous measurements that specify the voltage-power relationship to fit an equation to the measurements that can be used to compute the voltage that is expected to be provided at the input of inkjet printing system 500 when supplying the desired amount of power to heater 516.

Embodiments of controller 514 may be configured to operate in a manner so that inkjet printing system 500 may properly operate in an environment in which the impedance and/or voltage of AC power source 12 is changing or is not within a desired range of nominal values of impedance and/or voltage for which inkjet printing system will operate as desired. For example, controller 514 may be configured so that on the first power up of inkjet printing system 500 after installation into the environment, controller 514 operates to determine the relationship between the voltage provided by AC power source 12 and the power supplied. Then, controller 514 will adjust the operation of inkjet printing system 500, using the techniques previously described, so that inkjet printing system 500 is less likely to draw power sufficient to cause the voltage provided at its input to drop below a threshold for proper operation of the assemblies and devices included within it. Or controller 514 may follow this procedure each time power is applied to inkjet printing system 500 and/or before the start of an image forming operation and/or periodically during the time power is applied to inkjet printing system 500.

The disclosed embodiments of the systems allow for several performance benefits. The capability of the systems to adapt to the characteristics of the power source (such as the range of voltage provided by the power source and the impedance of the power source) that may be used with the installation of the system allows a single design of the system to operate reliably with power sources having a range of performance characteristics. In addition, use of the disclosed embodiments of the systems allows the assemblies and devices within the systems to be designed to properly operate over a more narrow range of system input voltages than they would have been without using these techniques and still achieve comparably reliable operation. For example, because power supply 20 included in system 10 or inkjet printing system 500 can be designed, with implementation of the disclosed techniques in embodiments of system 10 or inkjet printing system 500, for operation over a more narrow range of input voltages than would be the case without using the disclosed techniques, the cost of power supply 20 would be reduced. One way in which this cost reduction may come about for embodiments of power supply 20 that include a switching power supply would be the use of smaller capacity primary input capacitors. Likewise, other assemblies and devices used within embodiments of the systems may be designed for reduced cost because of the more narrow range of input voltages expected.

While the disclosed embodiments have been particularly shown and described, it should be understood that many variations may be made to these without departing from the spirit and scope defined in the following claims. The detailed description should be understood to include all novel and non-obvious combinations of the elements that have been described, and claims may be presented in this or a later application to any novel and non-obvious combination of these elements. Combinations of the above exemplary embodiments, and other embodiments not specifically described herein will be apparent upon reviewing the above detailed description. The foregoing embodiments are illustrative, and any single feature or element may not be included in the possible combinations that may be claimed in this or a later application. Therefore, the scope of the claimed subject matter should be determined with reference to the following claims, along with the full range of equivalents to which such claims are entitled.

What is claimed is:

1. A method comprising:

using a processing device for determining an amount of first power to supply to a load included in a system, using a relationship between a voltage provided by a power source to the system and a second power supplied by the power source to the system and using a minimum voltage value to be supplied to the system; and measuring an amount of the second power;

measuring the voltage corresponding to the amount of the second power;

using the amount of the second power measured and the voltage corresponding to the amount of the second power in the determining the amount of the first power to supply to the load; and supplying the amount of the first power to the load.

2. The method as recited in claim 1, further comprising:

determining the relationship between the voltage and the second power.

3. The method as recited in claim 2, wherein:

the determining the relationship includes measuring a plurality of voltages provided by the power source to the system.

4. The method as recited in claim 3, wherein:

the determining the relationship includes measuring a plurality of amounts of the second power supplied by the power source to the system corresponding to the plurality of the voltages.

5. The method as recited in claim 4, wherein:

the determining the relationship includes adjusting an amount of the first power supplied to the load to result in the power source providing the plurality of the amounts of the second power to the system.

6. The method as recited in claim 1, wherein:

the using the relationship includes determining from the relationship an expected change in the voltage to result from supplying the amount of the first power to the load.

7. The method as recited in claim 6, wherein:

the expected change in the voltage corresponds to an expected reduction in the voltage with the supplying the amount of the first power corresponding to an increase in the amount of the second power.

8. The method as recited in claim 1, wherein:

the supplying the amount of the first power includes controlling the load to increase the first power so that a decrease in the voltage results, with the voltage remaining greater than a threshold for a second load included in the system.

9. The method as recited in claim 8, wherein:

the load includes a heater;

the system includes a printing system;

the second load includes a power supply; and the power source includes an AC mains.

10. The method as recited in claim 1, wherein:

the determining the amount of the first power includes determining from the using the relationship an increase in the second power sufficient to change the voltage to a value at least as great as a lower operating voltage of a second load coupled to the power source.

11. The method as recited in claim 1, wherein:

the determining the amount of the first power includes accessing a look-up table specifying the relationship using a desired amount of the first power to determine a value expected for the voltage that results from supplying the desired amount of the first power.

12. The method as recited in claim 11, further comprising:

causing the desired amount of the first power to be supplied to the load if the value expected for the voltage exceeds a threshold voltage for proper operation of a second load coupled to the power source; and causing an amount less than the desired amount of the first power to be supplied to the load if the value expected for the voltage is less than the threshold voltage for proper operation.

13. The method of claim 1, wherein the first power is larger than the second power so as to compensate for impedance associated with the power source and so as to apply a second voltage to the load greater than the voltage.

14. An apparatus, comprising:

a processing device configured to determine an amount of a power to be supplied to a load of a system from an AC mains using an expected change in a value of a voltage provided by the AC mains to the system that would result from supplying the amount of the power to the load;

a device configured to provide an estimate of a second power supplied to the system by the power source, with the power corresponding to a first power; and wherein the processing device includes a configuration to determine a relationship between the value of the voltage and the second power; and wherein the processing device includes a configuration to determine the relationship between the value of the voltage and the second power during a time period corresponding to one or more of: during first power up after installation of the system, periodically during operation of the system, a predetermined time period during a day.

15. The apparatus as recited in claim 14, further comprising:

a power controller configured to adjust the power supplied to the load according to the amount of the power determined.

16. The apparatus as recited in claim 14, wherein:

the processing device includes a configuration to determine the amount of the power so that the expected change in the value of the voltage results in the value of the voltage provided by the power source exceeding a lower operating threshold voltage of a second load included in the system by at least a predetermined value.

17. A method comprising:

using a processing device for determining an amount of first power to supply to a load included in a system, using a relationship between a voltage provided by a power source to the system and a second power supplied by the power source to the system and using a minimum voltage value to be supplied to the system, wherein the determining the amount of the first power includes accessing a look-up table specifying the relationship using a desired amount of the first power to determine a value expected for the voltage that results from supplying the desired amount of the first power.

18. A method comprising:

using a processing device for determining an amount of first power to supply to a load included in a system, using a relationship between a voltage provided by a power source to the system and a second power supplied by the power source to the system and using a minimum voltage value to be supplied to the system, wherein the first power is larger than the second power so as to compensate for impedance associated with the power source and so as to apply a second voltage to the load greater than the voltage.

* * * * *